3,145,730
CONTROL VALVE
Frank G. Presnell, 2818 Laurel Canyon Place,
Los Angeles 46, Calif.
Filed Mar. 7, 1963, Ser. No. 263,537
7 Claims. (Cl. 137—493.2)

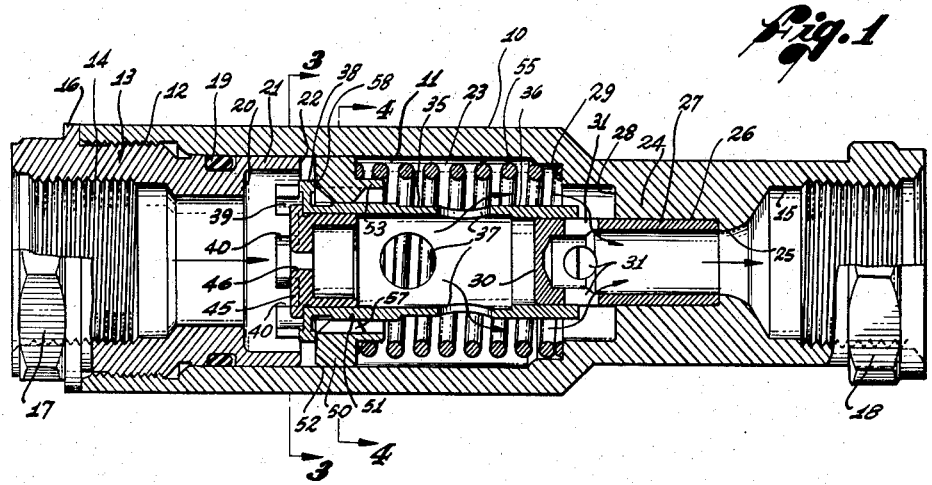

This invention relates generally to hydraulic flow control valves of the type which limit flow to a predetermined maximum by balancing a throttling element between a spring and a force due to pressure drop across a metering orifice.

It is a general object of the invention to provide improvements in this class of valve.

In a prior control valve (Patent No. 2,807,279), fluid flowed between coils of the spring, resulting in a pressure drop which increased as fluid viscosity increased, which tended to compress the spring during regulated flow, and which hence tended to reduce regulated flow at low fluid temperatures. A particular object of the present invention is to provide a hydraulic flow control valve wherein regulated flow does not pass between the spring coils, thus minimizing low-temperature reduction of regulated flow.

Another purpose of the present invention is to provide an improved flow control valve of the class mentioned so organized as to have a means for alleviating the shock to the valve that can result from sudden admission of hydraulic fluid to the upstream side of the valve when the downstream side of the valve is empty.

Another object is to provide a flow control valve in which the shock-alleviating means also serves as a novel valving arrangement permitting relatively unimpeded flow of fluid through the valve in the reverse direction.

Additional features of the invention will be evident from the following detailed description of an illustrative embodiment thereof, wherein:

FIG. 1 is a longitudinal section of an embodiment of the valve of the invention in position for regulated flow;

FIG. 2 is a view similar to FIG. 1, but showing the parts in a reverse flow position;

FIG. 3 is a section taken on line 3—3 of FIG. 1; and

FIG. 4 is a section taken on line 4—4 of FIG. 1.

In the drawing, the numeral 10 designates a generally cylindrical body, formed with an internal bore 11, which is internally threaded at one end, as at 12, to receive an externally threaded cap 13. Threaded ports 14 and 15 are formed in the cap and opposite end of the body, respectively, for connecting the valve in a hydraulic line. In regulated flow, port 14 forms the valve inlet, and port 15 the valve outlet. Cap 13 has a flange 16 which abuts the end of body 10, and is formed outside said flange with wrench flats 17. Similar wrench flats 18 are formed on the end of body 10 remote from cap 13. These facilitate screwing cap 13 into body 10, and making up of the valve in a hydraulic line.

The cap 13 completes the body 10, and is sealed thereto by O-ring 19. The cap has an inwardly facing annular stop shoulder 20, and therebeyond an inward cylindric extension 21 whose end 22 serves as a further stop or abutment. The stops 20 and 22 are for movable parts to be presently described.

It will be seen that the bore 11 forms a chamber 23 open to the cap port 14, and terminating at a wall 24. Wall 24 is bored, as presently described, and controllable ports provided to throttle the flow from chamber 23 through wall 24 to port 15. While this may be accomplished in various ways, one suitable arrangement will be described.

Wall 24 is axially drilled as at 25 and counterbored as at 26 to receive, with a press fit, a tubular pin 27 which projects inwardly into chamber 23. Wall 24 is also counterbored to form a stop shoulder 28, and, on a larger diameter, to form a spring seat 29.

Pin 27 has an inner end 30, and one or more lateral ports 31 to establish communication between chamber 23 and port 15. To control the flow through ports 31, a means is provided to vary the effective size of the ports 31, and is in this case in the general form of a sleeve 35 slidable on the pin 27. Sleeve 35 is formed with lateral ports 37, preferably staggered to preserve strength in the sleeve. Sleeve 35 is also formed, at its end remote from pin 27, with an outwardly extending flange 38 from whose periphery there extends a cylindrical flange 39, opposed to and engageable with aforementioned stop shoulder 20. This cylindrical flange 39 is formed with a plurality of notches 40 which form fluid ports when flange 39 is engaged against shoulder 20 (FIG. 2). A shouldered cup-shaped plug 45, with a central orifice 46, is pressed into the flange end of sleeve 35.

An annular piston 50, with a central bore 51, has an exterior cylindrical surface 52 slidably fitted inside body bore 11. While not essential, the piston 50 is preferably, and here shown, as slidably fitted on sleeve 35. This piston 50 has a spring-centering flange 53, and positioned thereby, and acting between the piston and shoulder 29, is a compression spring 55. This spring forces the piston 50 normally (or when there is no forward flow) against stop 22 (FIG. 2). The cylindrical surface of the central bore 51 is channeled to form fluid passages 57 (in this instance, three in number) extending along the sleeve between the two faces of the piston, and the piston, at a radius outside these fluid passages, is engageable with an annular seating surface 58 on sleeve flange 38 to interrupt fluid flow at that point.

In regulated flow, fluid enters port 14, and, impinging on plug 45 and flange 38, carries sleeve 35 in the direction of flow, causing seating surface 58 of flange 38 to engage piston 50, and so close passages 57. Fuid then flows through orifice 46, into sleeve 35, out through ports 37 to chamber 23, in through ports 31 to the bore of pin 27, and thence to port 15. The fluid flow through orifice 46 creates a pressure differential between the forward and rearward sides of the engaged sleeve and piston 50. The force on the assembly of sleeve and piston moves this assembly against spring 55, so that the sleeve 35 partially covers ports 31 to throttle the volume of fluid flowing to the outlet (FIG. 1). The volume of flow permitted to flow through the valve will depend upon the size of the orifice 46 and the resistance offered by the spring 55. If the inlet pressure increases, the assembly of interengaged sleeve 35 and piston 50 will move sleeve 35 in a direction to decrease the effective size of ports 31. If the pressure at the inlet falls, or the pressure in the outlet increases, sleeve 35 will be moved by spring 55 to increase the effective size of the ports 31.

It will be observed that the regulated flow outwardly of ports 37 and thence inwardly through throttling ports 31 does not pass through the narrow spaces between the coils of spring 55, with resulting pressure drop, as in certain prior valves. It will be understood that any increase in any such pressure drop between the coils of the spring, e.g., owing to increased viscosity at low temperature, would increase the spring-balancing force on the valve, and so move the sleeve to reduce the regulated flow at the throttling ports. It will be seen that the present valve has been contrived to avoid this problem by arranging for the regulated flow to stay inside the spring.

Various forms of valves of the prior art have provision for relatively unrestricted reverse flow, and the present valve incorporates such a feature in a unique manner.

With no forward flow through the valve, spring 55 seats piston 50 against stop 22. If fluid then flows through the valve in the reverse direction, it will enter chamber 23 via ports 31, flow into sleeve 35 via ports 37, and then flow through orifice 46 to the valve inlet. A pressure rise will occur within sleeve 35 and in chamber 23 which will provide a force acting on orifice plug 45 and flange 38 sufficient to move the sleeve to the left. This movement is limited by engagement of the sleeve against stop shoulder 20, as shown. This movement of sleeve 35 separates annular seat 58 from piston 50, and permits relatively free reverse flow, as shown by flow lines $f$, from chamber 23 through ports 57, then around the outside of flange 38, and inward through ports 40 to the valve inlet 15. Provision is thus made for relatively unimpeded reverse flow.

Assume now that the valve is empty of hydraulic fluid. There may now occur under some service conditions a sudden admission from the inflow line of fluid under high pressure. Under such conditions the shock of this sudden admission can damage the internal parts of a valve without some protective feature. In the present valve, such sudden admission moves the piston and sleeve together to the right, until the sleeve bottoms on shoulder 28. Thereafter, the pressure of incoming fluid on piston 50 moves the latter farther toward the right, further compressing spring 55, until a substantial flow passage is opened between piston 50 and flange 38. Incoming fluid then finds relief around the outside of flange 38, between seat 58 and piston 50, through piston passages 57, and so into the chamber 23, which it fills, and also via ports 37 into sleeve 35, which it fills also. The internal parts of the valve are then immune to surge damage.

I claim:

1. A valve body member having an inlet at one end, an outlet at the other, and an intermediate longitudinally disposed bore, a tubular means coaxial with said bore, fixed with said body member and having a lateral throttling port communicating with said outlet, a throttling sleeve member telescopically slidable relative to said tubular means and having a portion varying the effective size of said port, a wall member across said sleeve member exposed to fluid from said inlet, an enlarged head on the inlet end of said sleeve member presenting a seat facing toward the valve outlet, an annular piston member slidably fitted in said bore, said piston member having a seating surface engageable with said seat on said head of said sleeve member, abutment means on said body member providing a stop for said piston member in movement toward said inlet, a coil compression spring in said body member urging said piston member in the direction of said first-mentioned abutment means, and a second abutment means on said body member providing a stop for said sleeve member in movement toward said inlet when said seat on said head has separated from said seating surface on said piston member with said piston member in engagement with said first-mentioned abutment means, there being, in at least one of said members, a fluid passageway with an orifice therein providing communication between said inlet and said bore on the outlet side of said piston member, said second abutment means and said sleeve member being cooperatively formed to afford, when in engagement, a fluid passage between said inlet and the space between the then separated seat on said head and seating surface on said piston member, at least one of said piston and sleeve member being formed to provide a fluid passage from said bore on the outlet side of said piston member past said piston member to the region between the inlet side of said piston member and the head of said sleeve member, radially inward of said seat on said head.

2. A valve body having an inlet at one end, an outlet at the other, and an intermediate longitudinally disposed bore, a tubular means coaxial with said bore, fixed with said body and having a lateral throttling port communicating with said outlet, a throttling sleeve telescopically slidable relative to said tubular means and having a portion varying the effective size of said port, means on said sleeve forming an orifice which provides communication between said inlet and the interior of said sleeve, there being a lateral port in said sleeve opening to said bore, an enlarged head on the inlet end of said sleeve presenting a seat facing toward the valve outlet, an annular piston slidably fitted in said bore, said piston having a seating surface engageable with said seat on said head of said sleeve, abutment means on said body providing a stop for said piston in movement otward said inlet, a second abutment means on said body providing a stop for said sleeve in movement toward said inlet when said seat on said head has separated from said seating surface on said piston with said piston in engagement with said first-mentioned abutment means, said second abutment means and said sleeve being cooperatively formed to afford, when in engagement, a fluid passage between said inlet and the space between the then separated seat on said head and seating surface on said piston, a coil compression spring in said body urging said piston in the direction of said first-mentioned abutment means, at least one of said piston and sleeve being formed to provide a fluid passage from said bore on the outlet side of said piston past said piston to the region between the inlet side of said piston and the head of said sleeve, radially inward of said seat on said head.

3. The subject matter of claim 1, wherein said annular piston member is slidably fitted on said sleeve member on the outlet side of said head on said sleeve member.

4. The subject matter of claim 2, wherein said coil compression spring surrounds said sleeve, and one end thereof engages said piston, and a seating surface for the opposite end of said spring provided in said body spaced outside said sleeve, said spring surrounding said sleeve with clearance to afford a flow path inside thereof for fluid flowing from said lateral port in said sleeve to said throttling port.

5. The subject matter of claim 1, wherein said fluid passage is formed in and extends through said piston member.

6. The subject matter of claim 1, wherein said head on said sleeve member includes a peripheral flange extending toward said inlet and engageable with said second abutment means, and formed so as to afford, when in such engagement, said fluid passage between said inlet and the space between the then separated seat on said head and seating surface on said piston member.

7. The subject matter of claim 1, including stop means in said body member engageable by said sleeve member for limitation of movement of said sleeve member toward said outlet, said piston member and spring being arranged to afford said piston member a range of movement toward said outlet and away from said head after said sleeve member has engaged said stop means.

References Cited in the file of this patent

UNITED STATES PATENTS

| | | |
|---|---|---|
| 2,704,552 | De Verteuil | Mar. 22, 1955 |
| 2,807,279 | Presnell | Sept. 24, 1957 |
| 3,015,341 | Hedland et al. | Jan. 2, 1962 |
| 3,067,770 | Fancher | Dec. 11, 1962 |